(12) United States Patent
Kanda et al.

(10) Patent No.: US 12,323,058 B2
(45) Date of Patent: Jun. 3, 2025

(54) VOLTAGE CONVERSION DEVICE, AND CONTROL DEVICE FOR VOLTAGE CONVERSION DEVICE

(71) Applicant: YAZAKI CORPORATION, Tokyo (JP)

(72) Inventors: Keisuke Kanda, Susono (JP); Satoshi Ito, Susono (JP); Shota Yoshimitsu, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 18/438,405

(22) Filed: Feb. 10, 2024

(65) Prior Publication Data

US 2024/0186899 A1 Jun. 6, 2024

Related U.S. Application Data

(63) Continuation of application No. PCT/JP2023/001705, filed on Jan. 20, 2023.

(30) Foreign Application Priority Data

Feb. 1, 2022 (JP) .................................. 2022-014009

(51) Int. Cl.
| | |
|---|---|
| H02M 3/158 | (2006.01) |
| H02J 1/08 | (2006.01) |
| H02J 7/00 | (2006.01) |
| H02J 7/34 | (2006.01) |
| H02M 1/00 | (2006.01) |
| H02M 1/32 | (2007.01) |

(52) U.S. Cl.
CPC ............. *H02M 3/158* (2013.01); *H02J 1/082* (2020.01); *H02J 7/0068* (2013.01); *H02J 7/342* (2020.01); *H02M 1/0067* (2021.05); *H02M 1/32* (2013.01)

(58) Field of Classification Search
CPC ...... H02M 3/158; H02M 1/0067; H02M 1/32; H02M 1/007; H02J 1/082; H02J 7/0068; H02J 7/342; H02J 1/00; H02J 7/00
USPC .......................................................... 307/46
See application file for complete search history.

(56) References Cited

U.S. PATENT DOCUMENTS

| | | |
|---|---|---|
| 2005/0162146 A1 | 7/2005 | Kobayashi |
| 2011/0175452 A1 | 7/2011 | Hoshino |

(Continued)

FOREIGN PATENT DOCUMENTS

| | | |
|---|---|---|
| JP | 2000-350380 A | 12/2000 |
| JP | 2011-30362 A | 2/2011 |
| JP | 2012-115031 A | 6/2012 |

*Primary Examiner* — Richard Tan
(74) *Attorney, Agent, or Firm* — KENEALY VAIDYA LLP

(57) ABSTRACT

A voltage conversion device of the present disclosure includes: an HV-48V DC/DC converter that steps down a high voltage input from a high-voltage battery to 48 V; a first wire harness that supplies 48 V from the HV-48V DC/DC converter to a 48V load; an HV-12V DC/DC converter that steps down the high voltage input from the high-voltage battery to 12 V; a second wire harness that supplies 12 V from the HV-12V DC/DC converter to a 12V load; a 48V-12V DC/DC converter that is connected to the first wire harness and the second wire harness, steps down 48 V to 12 V, and steps up 12 V to 48 V; and a control device.

10 Claims, 11 Drawing Sheets

(56) References Cited

U.S. PATENT DOCUMENTS

2016/0118884 A1* 4/2016 Fernald ................ G06F 1/3287
　　　　　　　　　　　　　　　　　　　　　　　　323/268
2018/0319287 A1* 11/2018 Forssell ............. H01M 50/204
2019/0359079 A1* 11/2019 Mitsutani ............... H02J 1/082

* cited by examiner

VOLTAGE CONVERSION DEVICE, AND CONTROL DEVICE FOR VOLTAGE CONVERSION DEVICE

CROSS-REFERENCE TO RELATED APPLICATIONS

The present application is a continuation application of PCT/JP2023/001705 that claims priority to Japanese Patent Application No. 2022-014009 filed on Feb. 1, 2022, the entire content of which is incorporated herein by reference.

TECHNICAL FIELD

The present disclosure relates to a voltage conversion device and a control device for the voltage conversion device.

BACKGROUND ART

As a power supply device that supplies power from a plurality of power supplies to a load, there is known a power supply device that includes a DC power supply and a large-capacity capacitor, and supplies power from the large-capacity capacitor to the load when an output voltage of the DC power supply falls below a terminal voltage of the large-capacity capacitor (for example, see JP2000-350380A).

An object of the power supply device is, when a motor as a load is started up, that is, when large power is temporarily consumed, to stably supply power to the motor in a state where a voltage drop of a power supply output is prevented, and to prevent an increase in size of a power supply by reducing an average supplied power capacity of the power supply.

In a multi-power supply system including a high voltage (HV) system power supply, a 12V system power supply, and a 48V system power supply, it is conceivable to use an HV-48V converter and an HV-12V converter. In the multi-power supply system, when the HV-48V converter is designed such that efficiency of the HV-48V converter reaches a peak with respect to steady power of a 48V load, the efficiency of the HV-48V converter may be reduced with respect to peak power of the 48V load. On the other hand, when the HV-48V converter is designed such that the efficiency of the HV-48V converter reaches a peak with respect to the peak power of the 48V load, the efficiency of the HV-48V converter may be reduced with respect to the steady power of the 48V load.

In addition, in the above-mentioned multi-power supply system, in a case where the HV-48V converter is made bidirectional in order to cause an HV system power supply to regenerate regenerative power of the 48V load, the efficiency of the HV-48V converter is reduced. Further, in the above-mentioned multi-power supply system, in a case where a failure occurs in one of the HV-48V converter and the HV-12V converter, redundancy between the 12V system power supply and the 48V system power supply cannot be ensured.

SUMMARY OF INVENTION

The present disclosure provides, in a power supply system including a plurality of power supplies, a voltage conversion device capable of improving efficiency of a DC/DC converter, ensuring redundancy between the plurality of power supplies, and efficiently absorbing regenerative power, and a control device for the voltage conversion device.

According to an illustrative aspect of the present disclosure, a voltage conversion device includes: a first DC/DC converter connected to a storage battery that outputs a first voltage and configured to step down the first voltage input from the storage battery to a second voltage, a first power supply path configured to supply the second voltage from the first DC/DC converter to a first load, a second DC/DC converter connected to the storage battery and configured to step down the first voltage input from the storage battery to a third voltage lower than the second voltage, a second power supply path configured to supply the third voltage from the second DC/DC converter to a second load, a third DC/DC converter connected to the first power supply path and the second power supply path, configured to step down the second voltage input from the first power supply path to the third voltage, and step up the third voltage input from the second power supply path to the second voltage, and a control unit configured to control the first DC/DC converter, the second DC/DC converter, and the third DC/DC converter.

According to another illustrative aspect of the present disclosure, a control device controls a voltage conversion device, in which the voltage conversion device includes: a first DC/DC converter connected to a storage battery that outputs a first voltage and configured to step down the first voltage input from the storage battery to a second voltage; a first power supply path configured to supply the second voltage from the first DC/DC converter to a first load; a second DC/DC converter connected to the storage battery and configured to step down the first voltage input from the storage battery to a third voltage lower than the second voltage; a second power supply path configured to supply the third voltage from the second DC/DC converter to a second load; and a third DC/DC converter connected to the first power supply path and the second power supply path, configured to step down the second voltage input from the first power supply path to the third voltage, and step up the third voltage input from the second power supply path to the second voltage. Efficiency of the first DC/DC converter with respect to steady power of the first load is set to be higher than efficiency of the first DC/DC converter with respect to peak power of the first load. The control device is configured to, when the peak power of the first load is used, drive the first DC/DC converter to step down the first voltage input to the first DC/DC converter to the second voltage, and drive the third DC/DC converter to step up the third voltage input to the third DC/DC converter to the second voltage.

According to another illustrative aspect of the present disclosure, a control device controls a voltage conversion device, in which the voltage conversion device includes: a first DC/DC converter connected to a storage battery that outputs a first voltage and configured to step down the first voltage input from the storage battery to a second voltage; a first power supply path configured to supply the second voltage from the first DC/DC converter to a first load; a second DC/DC converter connected to the storage battery and configured to step down the first voltage input from the storage battery to a third voltage lower than the second voltage; a second power supply path configured to supply the third voltage from the second DC/DC converter to a second load; and a third DC/DC converter connected to the first power supply path and the second power supply path, configured to step down the second voltage input from the first power supply path to the third voltage, and step up the third voltage input from the second power supply path to the second voltage. Efficiency of the first DC/DC converter with respect to peak power of the first load is set to be higher than efficiency of the first DC/DC converter with respect to steady power of the first load. The control device is configured to, when the steady power of the first load is used, drive the first DC/DC converter to step down the first voltage input to the first DC/DC converter to the second voltage, and drive the third DC/DC converter to step down the second voltage input to the third DC/DC converter to the third voltage.

DESCRIPTION OF EMBODIMENTS

Figure 1:
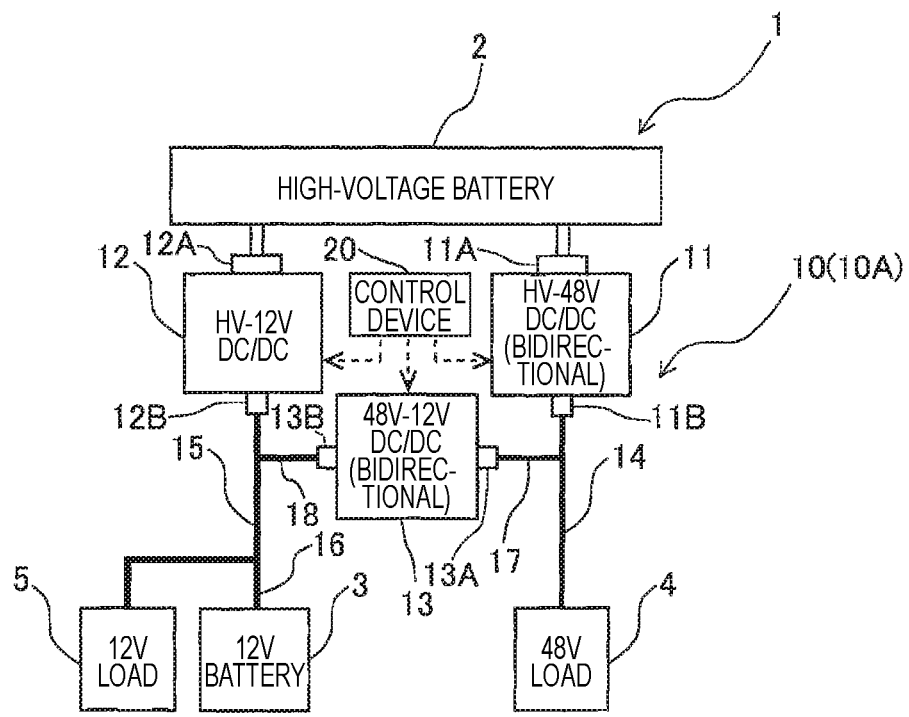
FIG. 1 is a diagram illustrating a voltage conversion device according to an embodiment of the present disclosure.

Hereinafter, the present disclosure will be described with reference to a preferred embodiment. The present disclosure is not limited to the following embodiment, and can be appropriately modified without departing from the gist of the present disclosure. In the following embodiment, a part of configurations may be not described or shown in the drawings, and regarding details of the omitted techniques, publicly known or well-known techniques will be appropriately applied as long as there is no contradiction with the contents to be described below.

FIG. 1 is a diagram illustrating a voltage conversion device 10 according to an embodiment of the present disclosure. The voltage conversion device 10 illustrated in FIG. 1 is applied to a multi-power supply system 1 of an electric vehicle including a high-voltage power supply (for example, about 400 V to 800 V), a 48V power supply, and a 12V power supply. The multi-power supply system 1 includes a high-voltage battery 2, a 12V battery 3, and the voltage conversion device 10, and supplies power to a 48V load 4, a 12V load 5, the 12V battery 3, and a high-voltage motor (not illustrated).

The multi-power supply system 1 supplies power from the high-voltage battery 2 to the above-mentioned high-voltage motor to drive the high-voltage motor during normal traveling of the electric vehicle. In addition, the multi-power supply system 1 absorbs the regenerative power of the 48V load 4 by the 12V battery 3 or the high-voltage battery 2.

The voltage conversion device 10 includes an HV-48V DC/DC converter 11, an HV-12V DC/DC converter 12, a 48V-12V DC/DC converter 13, a first wire harness 14, a second wire harness 15, a third wire harness 16, a fourth wire harness 17, a fifth wire harness 18, and a control device 20.

The HV-48V DC/DC converter 11 is a bidirectional DC/DC converter. A high-voltage side terminal 11A of the HV-48V DC/DC converter 11 is connected to the high-voltage battery 2, and a 48V side terminal 11B of the HV-48V DC/DC converter 11 is connected to the 48V load 4 via the first wire harness 14.

The HV-48V DC/DC converter 11 steps down a high voltage (HV, for example, 400 V to 800 V) output from the high-voltage battery 2 to 48 V and outputs the 48 V from the 48V-side terminal 11B. Accordingly, the power of 48V is supplied from the HV-48V DC/DC converter 11 to the 48V load 4 through the first wire harness 14. In addition, the regenerative power of the 48V load 4 is input to the HV-48V DC/DC converter 11 through the first wire harness 14. The HV-48V DC/DC converter 11 steps up the 48 V to a high voltage and outputs the high voltage from the high-voltage side terminal 11A to the high-voltage battery 2.

The HV-12V DC/DC converter 12 is a unidirectional DC/DC converter. A high-voltage side terminal 12A of the HV-12V DC/DC converter 12 is connected to the high-voltage battery 2, and a 12V side terminal 12B of the HV-12V DC/DC converter 12 is connected to the 12V load 5 via the second wire harness 15. In addition, the third wire harness 16 branches off from the second wire harness 15, and the 12V side terminal 12B of the HV-12V DC/DC converter 12 and the 12V battery 3 are connected by the second and third wire harnesses 15 and 16.

The HV-12V DC/DC converter 12 steps down the high voltage output from the high-voltage battery 2 to 12 V and outputs the 12 V from the 12V side terminal 12B. Accordingly, the power of 12 V is supplied from the HV-12V DC/DC converter 12 to the 12V load 5 through the second wire harness 15. In addition, the power of 12 V is supplied from the HV-12V DC/DC converter 12 to the 12V battery 3 through the second and third wire harnesses 15 and 16.

The fourth wire harness 17 branches off from the first wire harness 14 and is connected to a 48V side terminal 13A of the 48V-12V DC/DC converter 13. In addition, the fifth wire harness 18 branches off from the second wire harness 15 and is connected to a 12V side terminal 13B of the 48V-12V DC/DC converter 13.

The 48V-12V DC/DC converter 13 is a bidirectional DC/DC converter. The 48V-12V DC/DC converter 13 steps down the 48 V output from the HV-48V DC/DC converter 11 to 12 V and outputs the 12 V from the 12V side terminal 13B. The voltage of 12 V is supplied from the 48V-12V DC/DC converter 13 to the 12V load 5 through the fifth and second wire harnesses 18 and 15. In addition, the voltage of 12 V is supplied from the 48V-12V DC/DC converter 13 to the 12V battery 3 through the fifth, second, and third wire harnesses 18, 15, and 16.

In addition, the regenerative power of the 48V load 4 is input to the 48V-12V DC/DC converter 13 through the first and fourth wire harnesses 14 and 17. The 48V-12V DC/DC converter 13 steps down the 48 V to 12 V and outputs the 12 V from the 12V side terminal 13B. Accordingly, the voltage of 12 V is supplied from the 48V-12V DC/DC converter 13 to the 12V load 5 through the fifth and second wire harnesses 18 and 15. In addition, the voltage of 12 V is supplied from the 48V-12V DC/DC converter 13 to the 12V battery 3 through the fifth, second, and third wire harnesses 18, 15, and 16.

The 48V-12V DC/DC converter 13 steps up the 12 V output from the 12V battery 3 to 48 V and outputs the 48 V from the 48V side terminal 13A. Accordingly, the voltage of 48 V is supplied from the 48V-12V DC/DC converter 13 to the 48V load 4 through the fourth and first wire harnesses 17 and 14.

Figure 2:
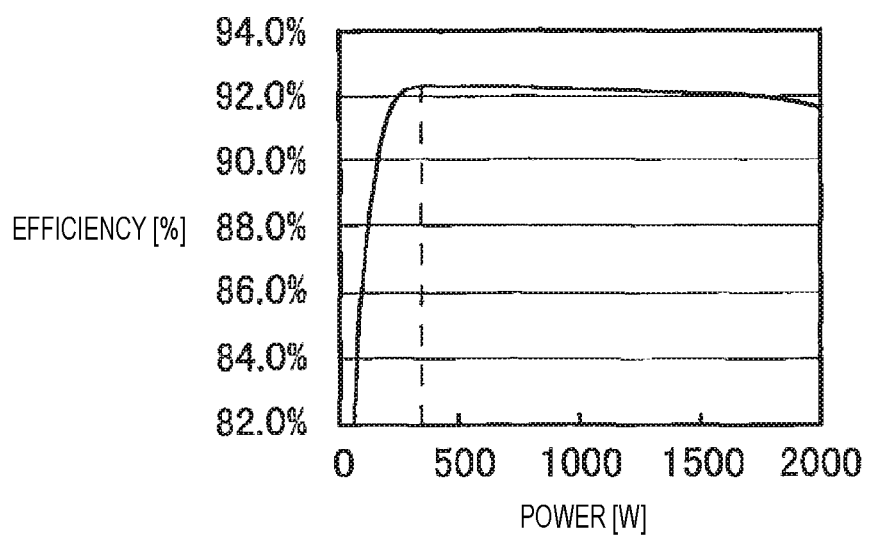
FIG. 2 is a graph illustrating a relation between power [W] and efficiency [%] of an HV-48V DC/DC converter illustrated in FIG. 1.

FIG. 2 is a graph illustrating a relation between power [W] and efficiency [%] of the HV-48V DC/DC converter 11 illustrated in FIG. 1. As illustrated in the graph, in the voltage conversion device 10 of the present embodiment, the HV-48V DC/DC converter 11 is designed such that efficiency of the HV-48V DC/DC converter 11 reaches a peak when an input power is 300 W. The power of 300 W is steady power of the 48V load 4. For example, the efficiency and loss of the HV-48V DC/DC converter 11 when the input power is 300 W are 92% and 24 W (=300 W×0.08). On the other hand, it is also conceivable to design the HV-48V DC/DC converter 11 such that the efficiency of the HV-48V DC/DC converter 11 reaches a peak when the input power is peak power (for example, 2,000 W). In this case, when the efficiency of the HV-48V DC/DC converter 11 is 92%, the loss is 160 W (=2,000 W×0.08). That is, by designing the HV-48V DC/DC converter 11 such that the efficiency of the HV-48V DC/DC converter 11 reaches a peak when the input power is the steady power of the 48V load 4, the loss of the HV-48V DC/DC converter 11 when the steady power of the 48V load 4 is used can be minimized.

FIGS. 3 to 7 are diagrams illustrating operations of the voltage conversion device 10 illustrated in FIG. 1. In FIGS. 3 to 7, a magnitude of supplied power is identified by a thickness of an arrow.

Figure 3:
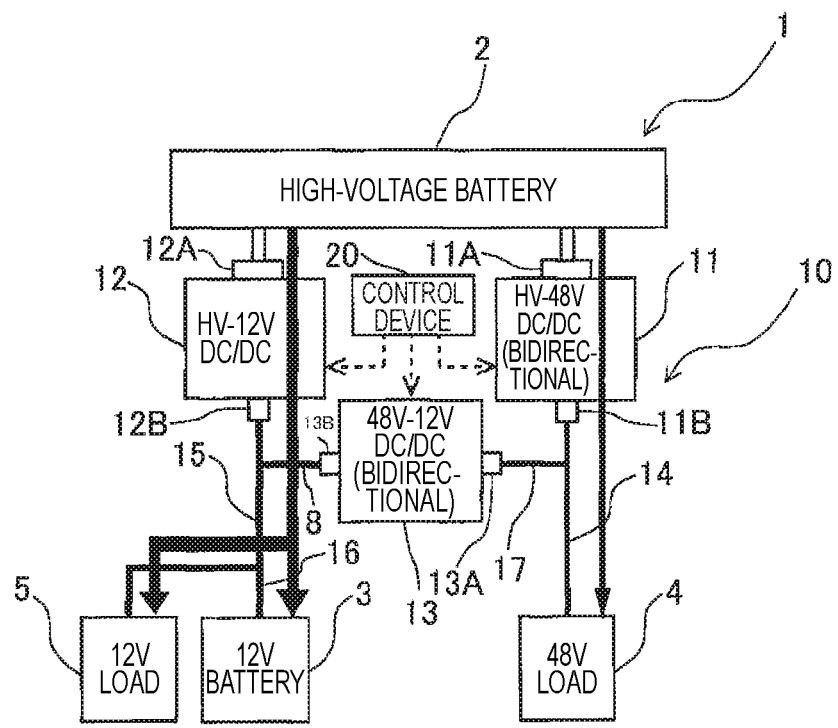
FIG. 3 is a diagram illustrating an operation of the voltage conversion device when steady power of a 48V load is used.

FIG. 3 is a diagram illustrating an operation (steady operation) of the voltage conversion device 10 when the steady power of the 48V load 4 is used. As illustrated in FIG. 3, when the steady power of the 48V load 4 is used, the control device 20 drives the HV-48V DC/DC converter 11 to step down the high voltage output from the high-voltage battery 2 to 48 V. In addition, the control device 20 drives the HV-12V DC/DC converter 12 to step down the high voltage output from the high-voltage battery 2 to 12 V. In this case, the control device 20 stops the 48V-12V DC/DC converter 13.

Accordingly, when the steady power of the 48V load 4 is used, the high voltage output from the high-voltage battery 2 is stepped down to 48 V by the HV-48V DC/DC converter 11 and supplied to the 48V load 4. In this case, the efficiency of the HV-48V DC/DC converter 11 reaches a peak, and high-efficiency voltage conversion of the HV-48V DC/DC converter 11 is realized.

In addition, when the steady power of the 48V load 4 is used, the high voltage output from the high-voltage battery 2 is stepped down to 12 V by the HV-12V DC/DC converter 12 and supplied to the 12V load 5. Further, when the steady power of the 48V load 4 is used, the high voltage output from the high-voltage battery 2 is stepped down to 12 V by the HV-12V DC/DC converter 12 and supplied to the 12V battery 3.

Figure 4:
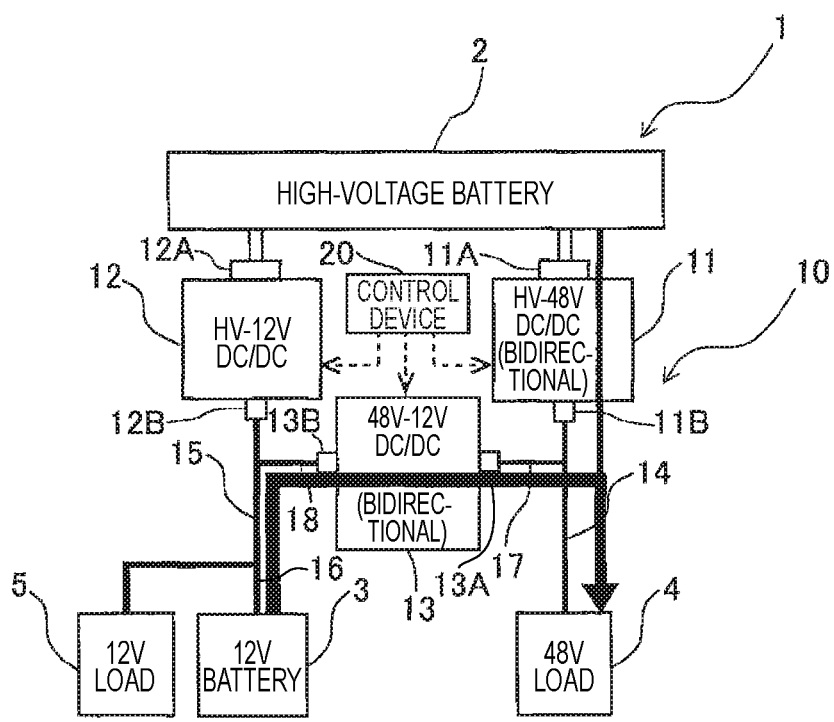
FIG. 4 is a diagram illustrating an operation of the voltage conversion device when peak power of the 48V load is used.

FIG. 4 is a diagram illustrating an operation of the voltage conversion device 10 when peak power of the 48V load 4 is used. As illustrated in FIG. 4, when the peak power of the 48V load 4 is used, the control device 20 drives the HV-48V DC/DC converter 11 to step down the high voltage output from the high-voltage battery 2 to 48 V. At the same time, the control device 20 drives the 48V-12V DC/DC converter 13 to step up the 12 V output from the 12V battery 3 to 48 V. Further, the control device 20 drives the HV-12V DC/DC converter 12 to step down the high voltage output from the high-voltage battery 2 to 12 V as necessary.

Accordingly, when the peak power of the 48V load 4 is used, the high voltage output from the high-voltage battery 2 is stepped down to 48 V by the HV-48V DC/DC converter 11 and supplied to the 48V load 4. At the same time, the 12 V output from the 12V battery 3 is stepped up to 48 V by the 48V-12V DC/DC converter 13 and supplied to the 48V load 4. In addition, the high voltage output from the high-voltage battery 2 is stepped down to 12 V by the HV-12V DC/DC converter 12 and supplied to the 12V battery 3 as necessary.

Here, in the voltage conversion device 10 of the present embodiment, the HV-48V DC/DC converter 11 is designed such that the efficiency of the HV-48V DC/DC converter 11 reaches a peak when the input power is the steady power of the 48V load 4. Therefore, when the input power of the HV-48V DC/DC converter 11 is the peak power of the 48V load 4, the efficiency of the HV-48V DC/DC converter 11 becomes lower than the peak. Therefore, in the voltage conversion device 10 of the present embodiment, the 48V-12V DC/DC converter 13 is driven to step up the 12 V output from the 12V battery 3 to 48 V and supply the 48 V to the 48V load 4, thereby assisting the supply of the peak power to the 48V load 4.

Figure 5:
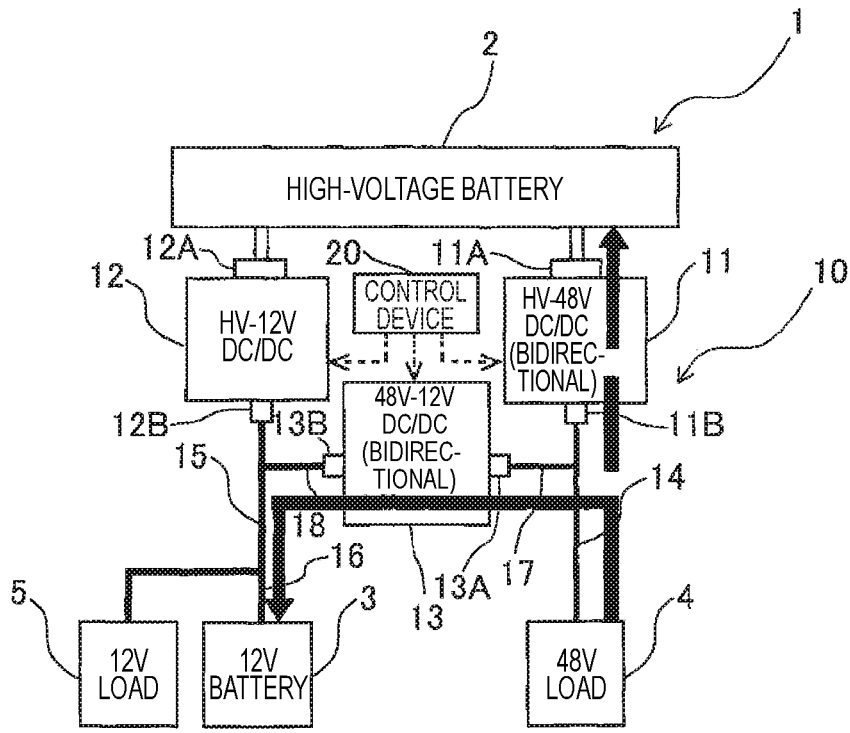
FIG. 5 is a diagram illustrating an operation of the voltage conversion device when regenerative power of the 48V load is generated.

FIG. 5 is a diagram illustrating an operation of the voltage conversion device 10 when regenerative power of the 48V load 4 is generated. As illustrated in FIG. 5, when the regenerative power of the 48V load 4 is generated, the control device 20 drives the 48V-12V DC/DC converter 13 to step down the 48 V output from the 48V load 4 to 12 V. In addition, the control device 20 drives the HV-48V DC/DC converter 11 to step up the 48 V output from the 48V load 4 to a high voltage as necessary, for example, at the time of absorption of the peak power.

Accordingly, when the regenerative power of the 48V load 4 is generated, the 48 V output from the 48V load 4 is stepped down by the 48V-12V DC/DC converter 13 and supplied to the 12V battery 3. In addition, when the absorption of the peak power or the like is necessary, the 48 V output from the 48V load 4 is stepped up by the HV-48V DC/DC converter 11 and supplied to the high-voltage battery 2.

Figure 6:
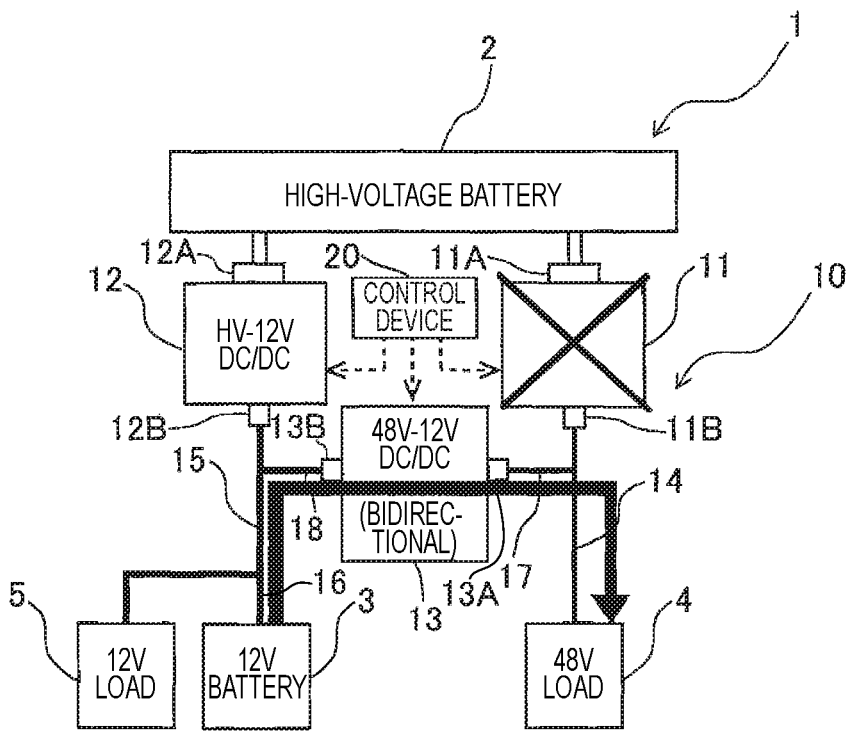
FIG. 6 is a diagram illustrating an operation of the voltage conversion device when the HV-48V DC/DC converter fails.

FIG. 6 is a diagram illustrating an operation of the voltage conversion device 10 when the HV-48V DC/DC converter 11 fails. As illustrated in FIG. 6, when the HV-48V DC/DC converter 11 fails, the control device 20 drives the 48V-12V DC/DC converter 13 to step up the 12 V output from the 12V battery 3 to 48 V.

Accordingly, when the HV-48V DC/DC converter 11 fails, the 12 V output from the 12V battery 3 is stepped up by the 48V-12V DC/DC converter 13 and supplied to the 48V load 4. That is, when the HV-48V DC/DC converter 11 fails, a voltage conversion function of the HV-48V DC/DC converter 11 is complemented by the 48V-12V DC/DC converter 13.

Figure 7:
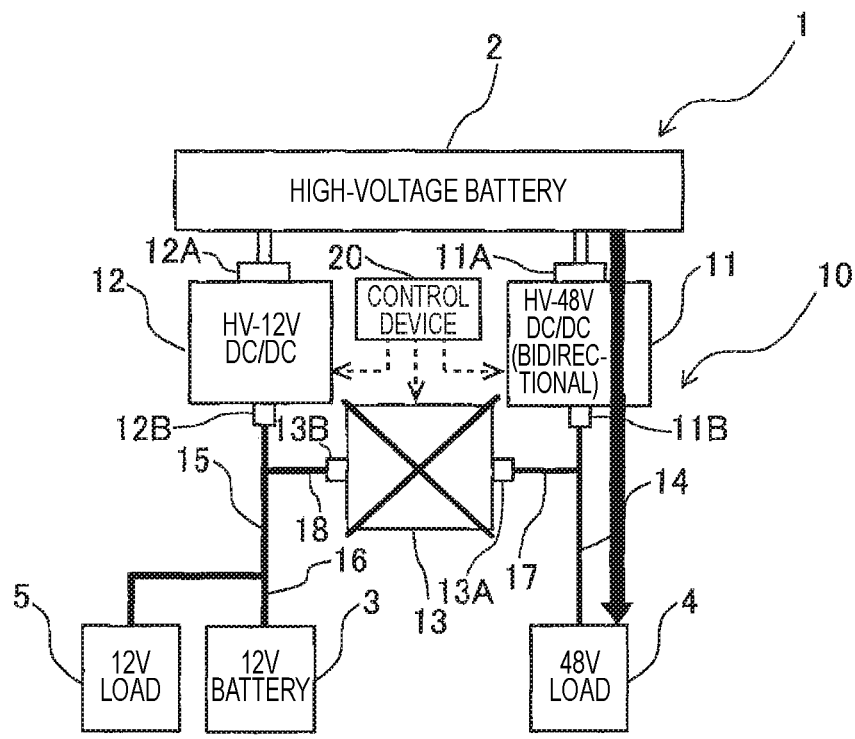
FIG. 7 is a diagram illustrating an operation of the voltage conversion device when a 48V-12V DC/DC converter fails.

FIG. 7 is a diagram illustrating an operation of the voltage conversion device 10 when the 48V-12V DC/DC converter 13 fails. As illustrated in FIG. 7, when the 48V-12V DC/DC converter 13 fails, the control device 20 drives the HV-48V DC/DC converter 11 to step down the high voltage output from the high-voltage battery 2 to 48 V.

Accordingly, when the 48V-12V DC/DC converter 13 fails, the high voltage output from the high-voltage battery 2 is stepped down by the HV-48V DC/DC converter 11 and supplied to the 48V load 4. That is, when the 48V-12V DC/DC converter 13 fails, a voltage conversion function of the 48V-12V DC/DC converter 13 is complemented by the HV-48V DC/DC converter 11.

As described above, in the voltage conversion device 10 of the present embodiment, the 48V-12V DC/DC converter 13 that converts 48 V and 12 V into two directions is provided between the 48V system power supply and the 12V system power supply so as to connect the 48V system power supply and the 12V system power supply. Accordingly, the efficiency of the HV-48V DC/DC converter 11 can be improved, the redundancy between the 48V system power supply and the 12V system power supply can be ensured, and the regenerative power of the 48V load 4 can be efficiently absorbed.

Specifically, in the voltage conversion device 10 of the present embodiment, the efficiency of the HV-48V DC/DC converter 11 is set to reach a peak when the input power is the steady power of the 48V load 4 from the viewpoint of maximally preventing a loss in the voltage conversion of the HV-48V DC/DC converter 11. Accordingly, when the steady power of the 48V load 4 is used, the input power of the HV-48V DC/DC converter 11 is set to the steady power of the 48V load 4, and the HV-48V DC/DC converter 11 can be driven with high efficiency. On the other hand, when the peak power of the 48V load 4 is used, the 48V-12V DC/DC converter 13 is driven to step up the 12 V output from the 12V battery 3 to 48 V and supply the 48 V to the 48V load 4, thereby assisting the supply of the peak power to the 48V load 4. Accordingly, even when the peak power of the 48V load 4 is used, the input power of the HV-48V DC/DC converter 11 is set to the steady power of the 48V load 4, and the HV-48V DC/DC converter 11 can be driven with high efficiency.

When the HV-48V DC/DC converter 11 fails, the voltage conversion function of the HV-48V DC/DC converter 11 can be complemented by driving the 48V-12V DC/DC converter 13 to supply power from the 12V battery 3 to the 48V load 4. On the other hand, when the 48V-12V DC/DC converter 13 fails, the voltage conversion function of the 48V-12V DC/DC converter 13 can be complemented by driving the HV-48V DC/DC converter 11 to supply power from the high-voltage battery 2 to the 48V load 4.

Further, the regenerative power of the 48V load 4 can be regenerated in the 12V battery 3 by driving the 48V-12V DC/DC converter 13. Accordingly, an opportunity for power conversion in a reverse direction of the HV-48V DC/DC converter 11 can be reduced, and a reduction in efficiency of the HV-48V DC/DC converter 11 can be prevented.

Figure 8:
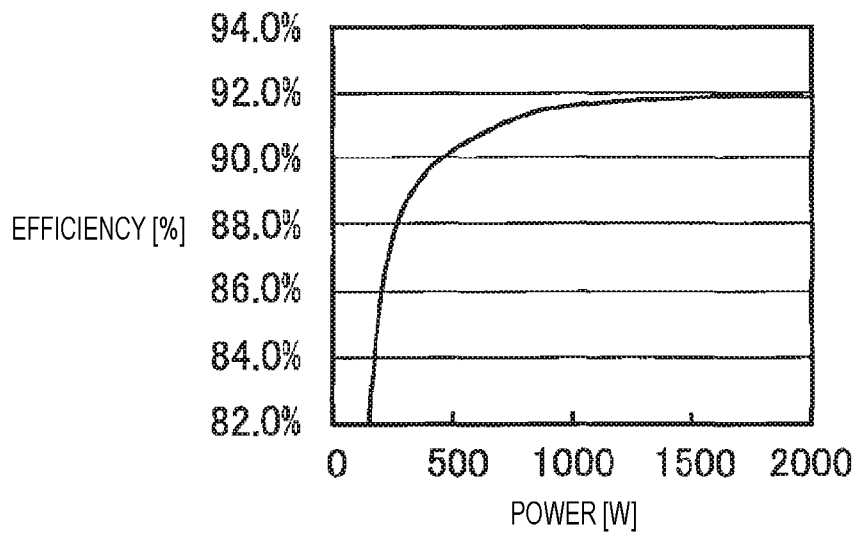
FIG. 8 is a graph illustrating a relation between power [W] and efficiency [%] of an HV-48V DC/DC converter in a voltage conversion device according to another embodiment of the present disclosure.

FIG. 8 is a graph illustrating a relation between power [W] and efficiency [%] of the HV-48V DC/DC converter 11 in a voltage conversion device 10A (see FIG. 1) according to another embodiment of the present disclosure. As illustrated in the graph, in the voltage conversion device 10A of the present embodiment, the HV-48V DC/DC converter 11 is designed such that the efficiency of the HV-48V DC/DC converter 11 reaches a peak when the input power is 2,000 W. The power of 2,000 W is the peak power of the 48V load 4.

Here, in the voltage conversion device 10A of the present embodiment, as will be described later, when the steady power of the 48V load 4 is used, the input power of the HV-48V DC/DC 11 is 1,200 W. In a case where the input power of the HV-48V DC/DC converter 11 is 1,200 W, the efficiency of the HV-48V DC/DC converter 11 is lower than that when the input power is 2,000 W, and is higher than that when the input power is 300 W.

FIGS. 9 to 13 are diagrams illustrating operations of the voltage conversion device 10A of the present embodiment. In FIGS. 9 to 13, a magnitude of supplied power is identified by a thickness of an arrow.

Figure 9:
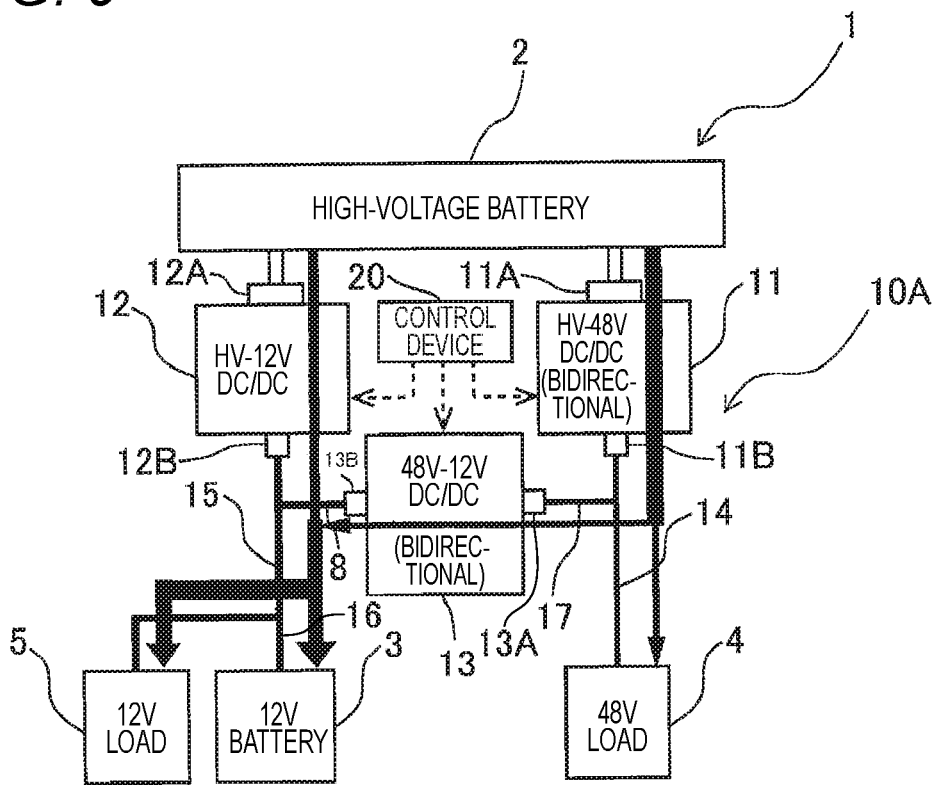
FIG. 9 is a diagram illustrating an operation of the voltage conversion device when steady power of a 48V load is used.

FIG. 9 is a diagram illustrating an operation of the voltage conversion device 10A when the steady power of the 48V load 4 is used. As illustrated in FIG. 9, when the steady power of the 48V load 4 is used, the control device 20 drives the HV-48V DC/DC converter 11 to step down the high voltage output from the high-voltage battery 2 to 48 V. At the same time, the control device 20 drives the 48V-12V DC/DC converter 13 to step down the 48 V output from the HV-48V DC/DC converter 11 to 12 V. In addition, the control device 20 drives the HV-12V DC/DC converter 12 to step down the high voltage output from the high-voltage battery 2 to 12 V.

Accordingly, when the steady power of the 48V load 4 is used, the high voltage output from the high-voltage battery 2 is stepped down to 48 V by the HV-48V DC/DC converter 11 and supplied to the 48V load 4. At the same time, the 48 V output from the HV-48V DC/DC converter 11 is stepped down to 12 V by the 48V-12V DC/DC converter 13 and supplied to the 12V battery 3. In addition, the high voltage output from the high-voltage battery 2 is stepped down to 12 V by the HV-12V DC/DC converter 12 and supplied to the 12V battery 3 and the 12V load 5.

Here, the input power of the HV-48V DC/DC converter 11 is 1,200 W (=300 W+900 W), and the 48V-12V DC/DC converter 13 converts power of a 1200 W-48V system into power of a 900 W-12V system. As illustrated in the graph of FIG. 8, in a case where the input power of the HV-48V DC/DC converter 11 is 1,200 W, the efficiency of the HV-48V DC/DC converter 11 is lower than that when the input power is 2,000 W, but is higher than that when the input power is 300 W. Accordingly, the efficiency of the HV-48V DC/DC converter 11 does not reach the peak, but becomes high, and high-efficiency voltage conversion of the HV-48V DC/DC converter 11 is realized.

Figure 10:
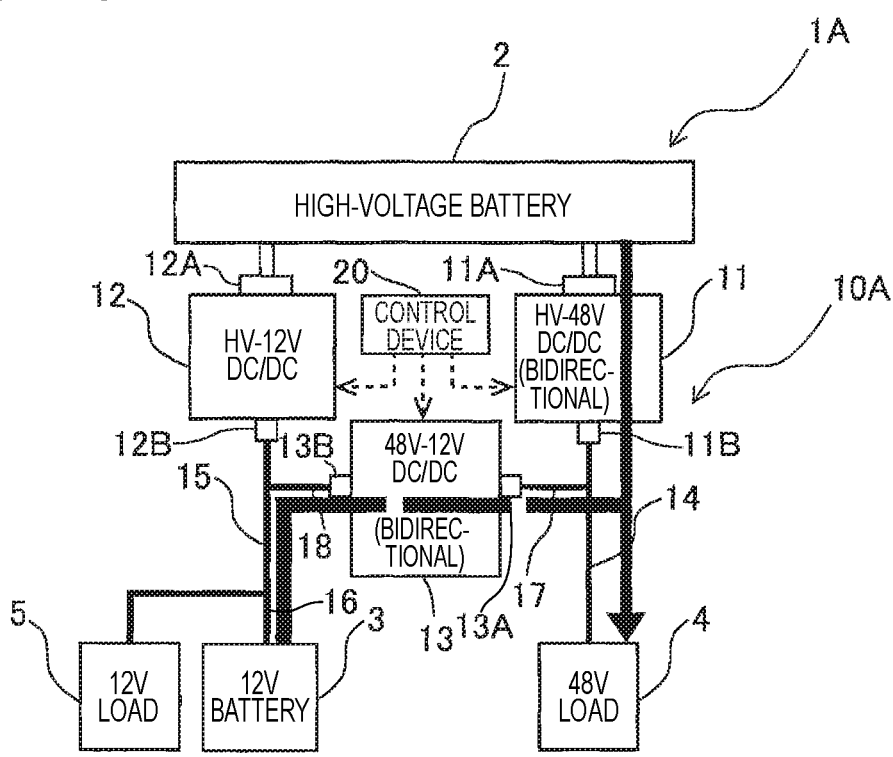
FIG. 10 is a diagram illustrating an operation of the voltage conversion device when peak power of the 48V load is used.

FIG. 10 is a diagram illustrating an operation of the voltage conversion device 10A when the peak power of the 48V load 4 is used. As illustrated in FIG. 10, when the peak power of the 48V load 4 is used, the control device 20 drives the HV-48V DC/DC converter 11 to step down the high voltage output from the high-voltage battery 2 to 48 V. In addition, in a case where responsiveness to the peak power of the 48V load 4 or the supplied power is insufficient, the control device 20 drives the 48V-12V DC/DC converter 13 to step up the 12 V output from the 12V battery 3 to 48 V.

Accordingly, when the peak power of the 48V load 4 is used, the high voltage output from the high-voltage battery 2 is stepped down to 48 V by the HV-48V DC/DC converter 11 and supplied to the 48V load 4. In this case, the input power of the HV-48V DC/DC converter 11 is the peak power of the 48V load 4, and high-efficiency voltage conversion of the HV-48V DC/DC converter 11 is realized.

In addition, in a case where the responsiveness to the peak power of the 48V load 4 or the supplied power is insufficient, the 12 V output from the 12V battery 3 is stepped up to 48 V by the 48V-12V DC/DC converter 13 and supplied to the 48V load 4 (indicated by a broken line). Accordingly, the supply of the peak power to the 48V load 4 is assisted.

Figure 11:
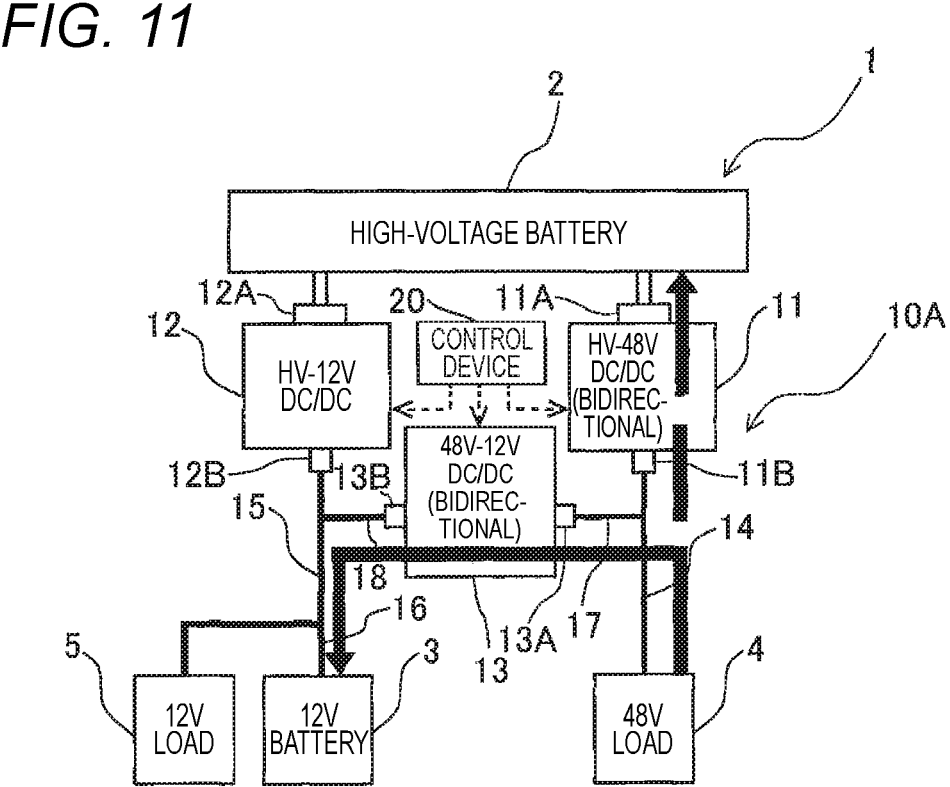
FIG. 11 is a diagram illustrating an operation of the voltage conversion device when regenerative power of the 48V load is generated.

FIG. 11 is a diagram illustrating an operation of the voltage conversion device 10A when the regenerative power of the 48V load 4 is generated. As illustrated in FIG. 11, when the regenerative power of the 48V load 4 is generated, the control device 20 drives the 48V-12V DC/DC converter 13 to step down the 48 V output from the 48V load 4 to 12 V. In addition, the control device 20 drives the HV-48V DC/DC converter 11 to step up the 48 V output from the 48V load 4 to a high voltage as necessary, for example, at the time of absorption of the peak power.

Accordingly, the regenerative power of 48 V of the 48V load 4 is stepped down by the 48V-12V DC/DC converter 13 and supplied to the 12V battery 3. In addition, when the absorption of the peak power or the like is necessary, the regenerative power of 48 V of the 48V load 4 is stepped up to a high voltage by the HV-48V DC/DC converter 11 and supplied to the high-voltage battery 2 (indicated by a broken line).

Figure 12:
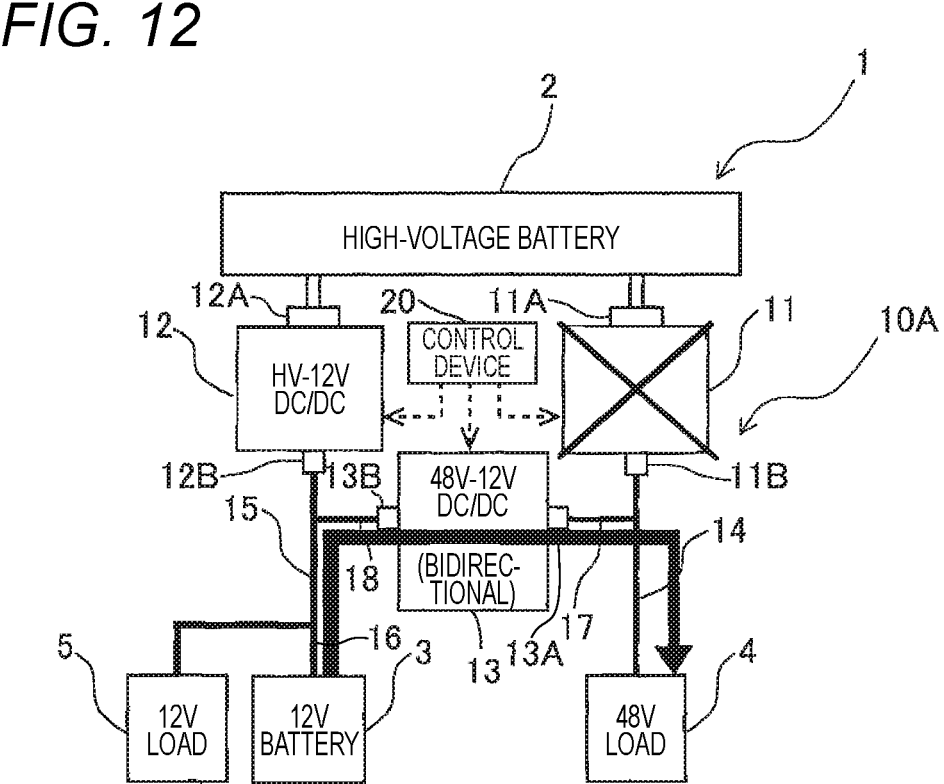
FIG. 12 is a diagram illustrating an operation of the voltage conversion device when the HV-48V DC/DC converter fails.

FIG. 12 is a diagram illustrating an operation of the voltage conversion device 10A when the HV-48V DC/DC converter 11 fails. As illustrated in FIG. 12, when the HV-48V DC/DC converter 11 fails, the control device 20 drives the 48V-12V DC/DC converter 13 to step up the 12 V output from the 12V battery 3 to 48 V.

Accordingly, when the HV-48V DC/DC converter 11 fails, the 12 V output from the 12V battery 3 is stepped up by the 48V-12V DC/DC converter 13 and supplied to the 48V load 4. That is, when the HV-48V DC/DC converter 11 fails, a voltage conversion function of the HV-48V DC/DC converter 11 is complemented by the 48V-12V DC/DC converter 13.

Figure 13:
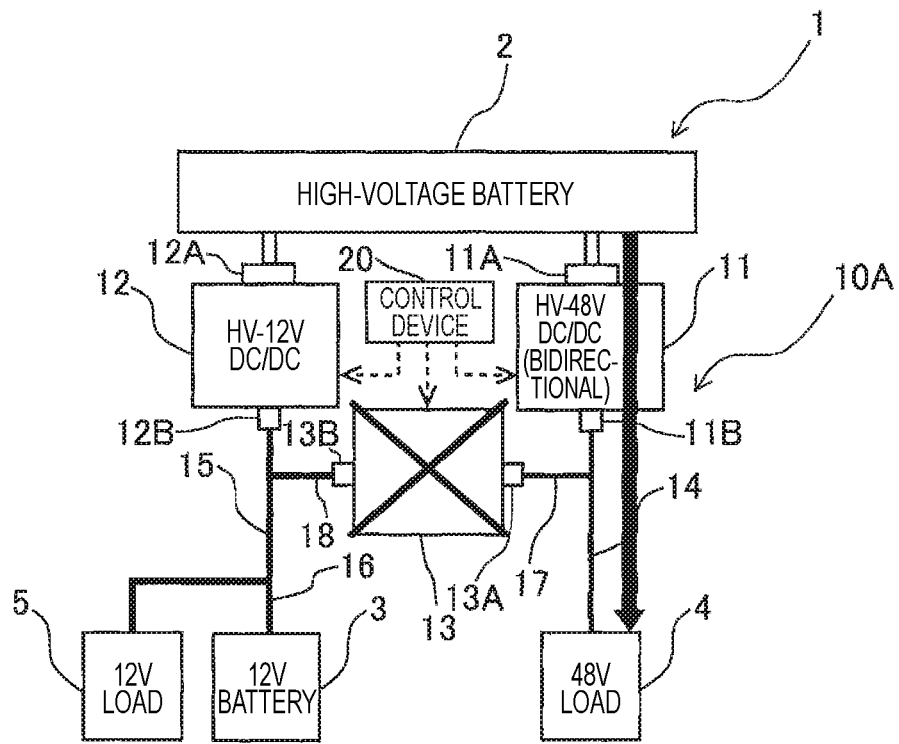
FIG. 13 is a diagram illustrating an operation of the voltage conversion device when a 48V-12V DC/DC converter fails.

FIG. 13 is a diagram illustrating an operation of the voltage conversion device 10A when the 48V-12V DC/DC converter 13 fails. As illustrated in FIG. 13, when the 48V-12V DC/DC converter 13 fails, the control device 20 drives the HV-48V DC/DC converter 11 to step down the high voltage output from the high-voltage battery 2 to 48 V.

Accordingly, when the 48V-12V DC/DC converter 13 fails, the high voltage output from the high-voltage battery 2 is stepped down by the HV-48V DC/DC converter 11 and supplied to the 48V load 4. That is, when the 48V-12V DC/DC converter 13 fails, a voltage conversion function of the 48V-12V DC/DC converter 13 is complemented by the HV-48V DC/DC converter 11.

As described above, in the voltage conversion device 10A of the present embodiment, the efficiency of the HV-48V DC/DC converter 11 is set to reach a peak when the input power is the peak power of the 48V load 4 from the viewpoint of maximally increasing the efficiency of the HV-48V DC/DC converter 11 when the peak power of the 48V load 4 is used. Accordingly, when the peak power of the 48V load 4 is used, the input power of the HV-48V DC/DC converter 11 is set to the peak power, and the HV-48V DC/DC converter 11 can be driven with high efficiency. On the other hand, when the steady power of the 48V load 4 is used, the 48V-12V DC/DC converter 13 is driven to supply power to the 12V load 5 or the 12V battery 3. Accordingly, when the steady power of the 48V load 4 is used, the input power of the HV-48V DC/DC converter 11 is set to intermediate power between the steady power and the peak power, and the HV-48V DC/DC converter 11 can be driven with high efficiency. In addition, by assisting power supply to the 12V load 5, conversion power of the HV-12V DC/DC converter 12 can be reduced, which contributes to achieving an increase in efficiency of the HV-12V DC/DC converter 12.

Figure 14:
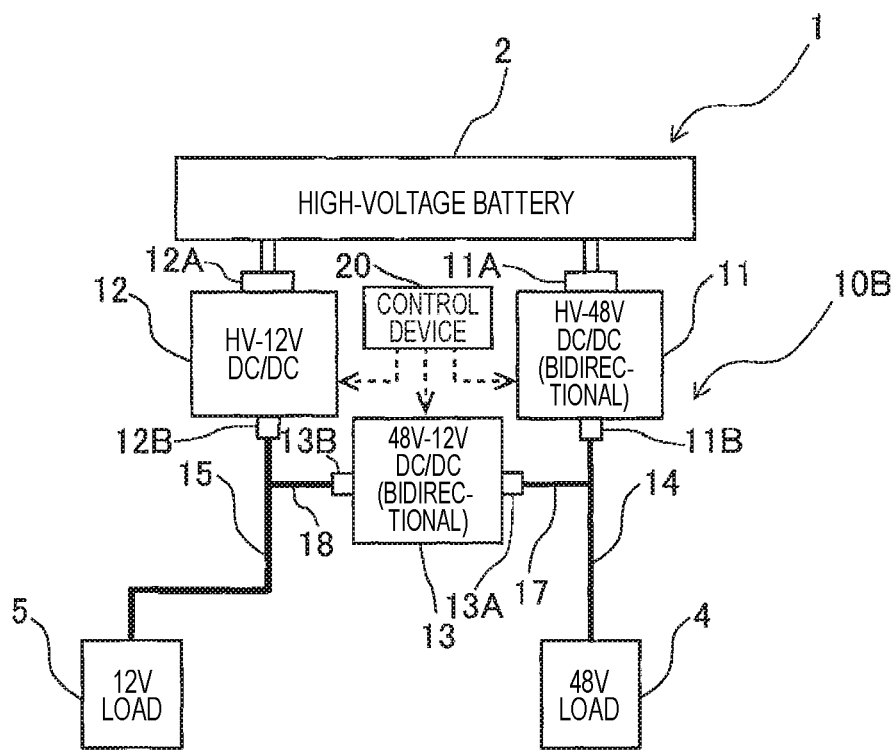
FIG. 14 is a diagram illustrating a voltage conversion device according to another embodiment of the present disclosure.

FIG. 14 is a diagram illustrating a voltage conversion device 10B according to another embodiment of the present disclosure. As illustrated in FIG. 14, the voltage conversion device 10B of the present embodiment is different from the voltage conversion devices 10 and 10A of the above-mentioned embodiments in that the 12V battery is not provided.

Figure 15:
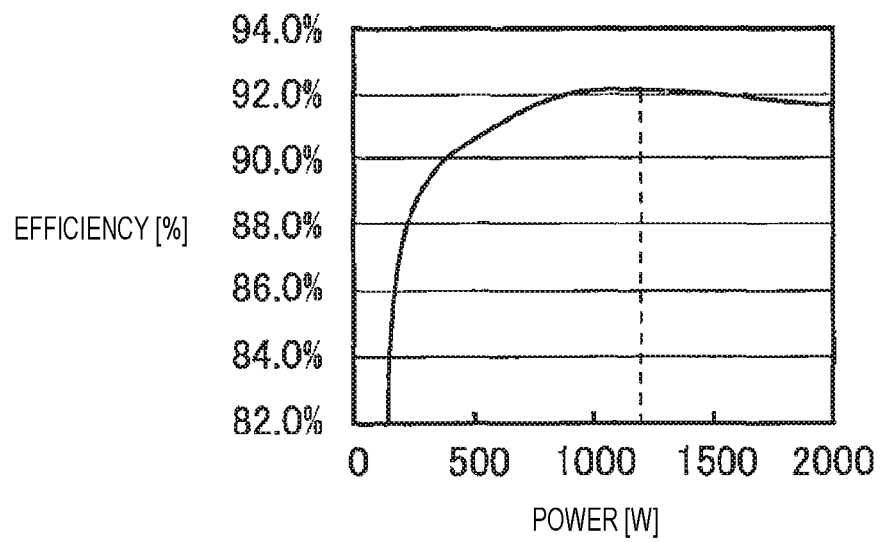
FIG. 15 is a graph illustrating a relation between power [W] and efficiency [%] of an HV-48V DC/DC converter in the voltage conversion device illustrated in FIG. 14.

FIG. 15 is a graph illustrating a relation between power [W] and efficiency [%] of the HV-48V DC/DC converter 11 in the voltage conversion device 10B illustrated in FIG. 14. As illustrated in the graph, in the voltage conversion device 10B of the present embodiment, the HV-48V DC/DC converter 11 is designed such that the efficiency of the HV-48V DC/DC converter 11 reaches a peak when the input power is 1,200 W. The steady power of the 48V load 4 is 300 W, and the peak power of the 48V load 4 is 2,000 W.

FIGS. 16 to 21 are diagrams illustrating operations of the voltage conversion device 10B of the present embodiment. In FIGS. 16 to 21, a magnitude of supplied power is identified by a thickness of an arrow.

Figure 16:
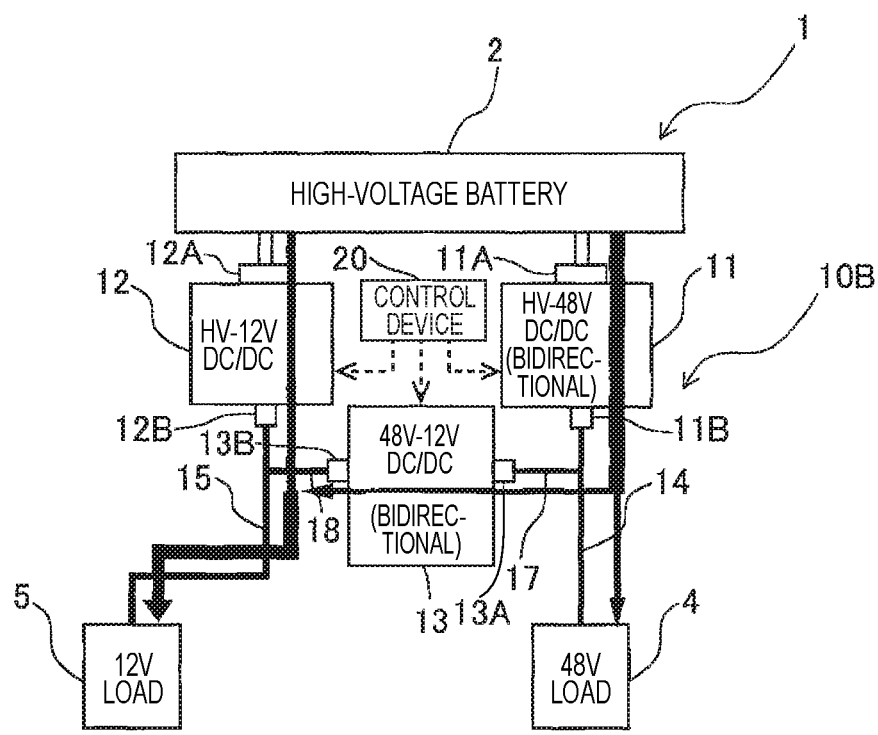
FIG. 16 is a diagram illustrating an operation of the voltage conversion device when steady power of a 48V load is used.

FIG. 16 is a diagram illustrating an operation of the voltage conversion device 10B when the steady power of the 48V load 4 is used. As illustrated in FIG. 16, when the steady power of the 48V load 4 is used, the control device 20 drives the HV-48V DC/DC converter 11 to step down the high voltage output from the high-voltage battery 2 to 48 V. In addition, the control device 20 drives the HV-12V DC/DC converter 12 to step down the high voltage output from the high-voltage battery 2 to 12 V. Further, when power used by the 48V load 4 is a low load lower than 1,200 W, the control device 20 drives the 48V-12V DC/DC converter 13 to step down the 48 V output from the HV-48V DC/DC converter 11 to 12 V.

Accordingly, when the steady power of the 48V load 4 is used, the high voltage output from the high-voltage battery 2 is stepped down to 48 V by the HV-48V DC/DC converter 11 and supplied to the 48V load 4. In addition, the high voltage output from the high-voltage battery 2 is stepped down to 12 V by the HV-12V DC/DC converter 12 and supplied to the 12V load 5. Further, when the 48V load 4 is a low load, the 48 V output from the HV-48V DC/DC converter 11 is stepped down to 12 V by the 48V-12V DC/DC converter 13 and supplied to the 12V load 5.

Here, since the 48V load 4 is a low load, in a case where an operation mode of the HV-48V DC/DC converter 11 shifts to a discontinuous mode, the efficiency of the HV-48V DC/DC converter 11 is reduced. Therefore, in a case where the 48V load 4 is a low load, the input power of the HV-48V DC/DC converter 11 is set to 1,200 W (=300 W+900 W), and the 48V-12V DC/DC converter 13 converts the power of the 1200 W-48V system to the power of the 900 W-12V system. Accordingly, the operation mode of the HV-48V DC/DC converter 11 can be maintained in a continuous mode, and the efficiency of the HV-48V DC/DC converter 11 can be maintained at high efficiency.

Figure 17:
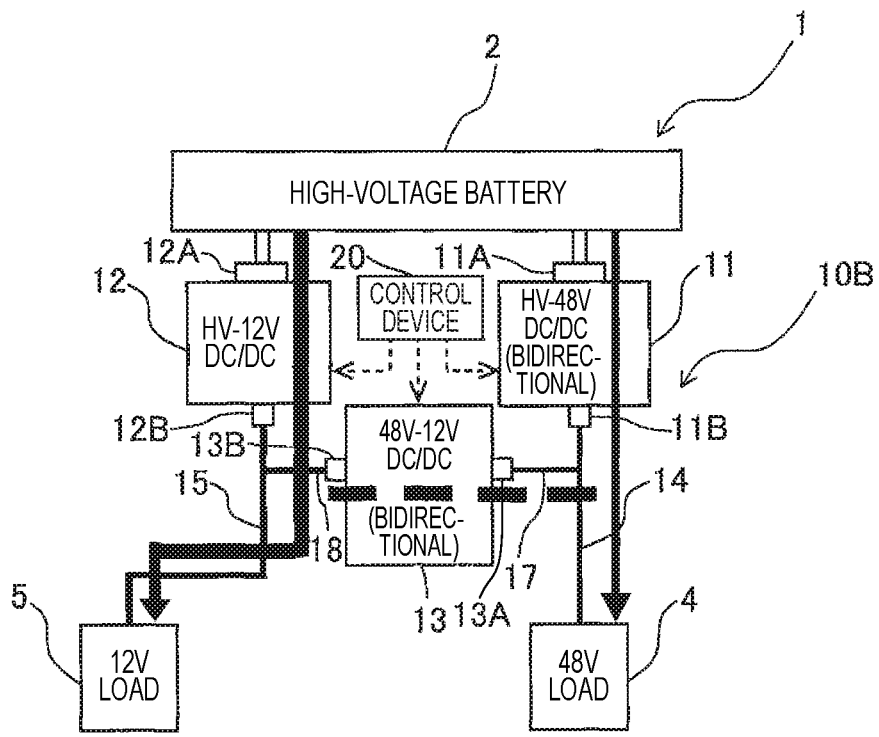
FIG. 17 is a diagram illustrating an operation of the voltage conversion device when peak power of the 48V load is used.

FIG. 17 is a diagram illustrating an operation of the voltage conversion device 10B when the peak power of the 48V load 4 is used. As illustrated in FIG. 17, when the peak power of the 48V load 4 is used, the control device 20 drives the HV-48V DC/DC converter 11 to step down the high voltage output from the high-voltage battery 2 to 48 V. In addition, the control device 20 drives the HV-12V DC/DC converter 12 to step down the high voltage output from the high-voltage battery 2 to 12 V. Further, in a case where the responsiveness to the peak power of the 48V load 4 or the supplied power is insufficient, the control device 20 drives the 48V-12V DC/DC converter 13 to step up the 12 V output from the HV-12V DC/DC converter 12 to 48 V.

Accordingly, when the peak power of the 48V load 4 is used, the high voltage output from the high-voltage battery 2 is stepped down to 48 V by the HV-48V DC/DC converter 11 and supplied to the 48V load 4. In addition, the high voltage output from the high-voltage battery 2 is stepped down to 12 V by the HV-12V DC/DC converter 12 and supplied to the 12V load 5. Further, in a case where the responsiveness to the peak power of the 48V load 4 or the supplied power is insufficient, the 12 V output from the HV-12V DC/DC converter 12 is stepped up to 48 V by the 48V-12V DC/DC converter 13 and supplied to the 48V load 4 (indicated by a broken line). Accordingly, the supply of the peak power to the 48V load 4 is assisted.

Figure 18:
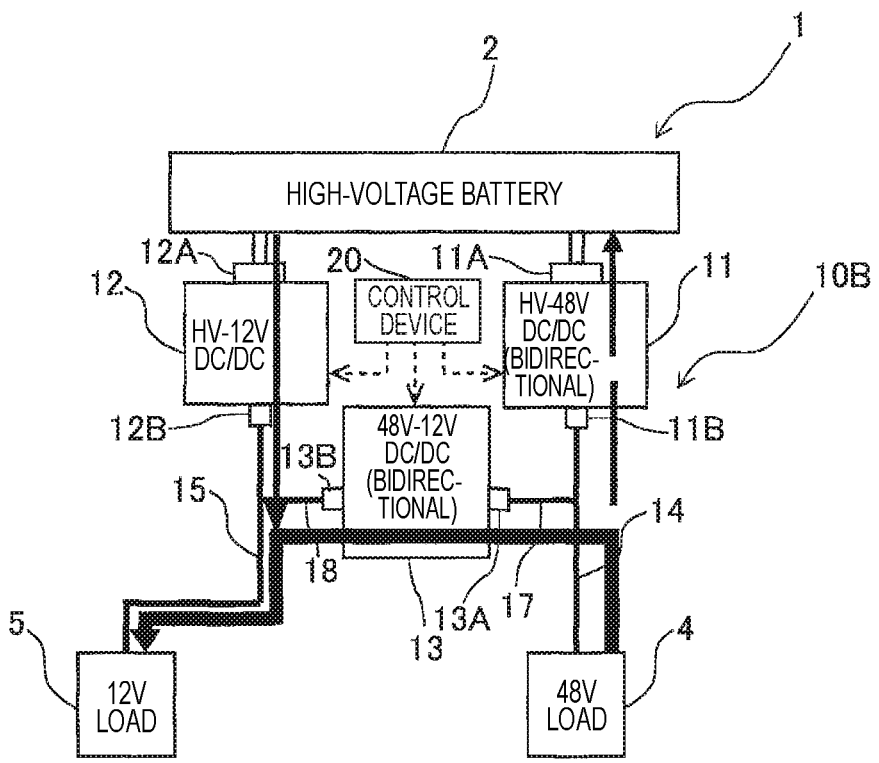
FIG. 18 is a diagram illustrating an operation of the voltage conversion device when regenerative power of the 48V load is generated.

FIG. 18 is a diagram illustrating an operation of the voltage conversion device 10B when the regenerative power of the 48V load 4 is generated. As illustrated in FIG. 18, when the regenerative power of the 48V load 4 is generated, the control device 20 drives the 48V-12V DC/DC converter 13 to step down the 48 V output from the 48V load 4 to 12 V. In addition, the control device 20 drives the HV-48V DC/DC converter 11 to step up the 48 V output from the 48V load 4 to a high voltage as necessary, for example, at the time of absorption of the peak power of the 48V load 4.

Accordingly, the regenerative power of 48 V of the 48V load 4 is stepped down to 12 V by the 48V-12V DC/DC converter 13 and supplied to the 12V load 5. In addition, when the absorption of the peak power of the 48V load 4 or the like is necessary, the 48 V output from the 48V load 4 is stepped up to a high voltage by the HV-48V DC/DC converter 11 and supplied to the high-voltage battery 2.

Figure 19:
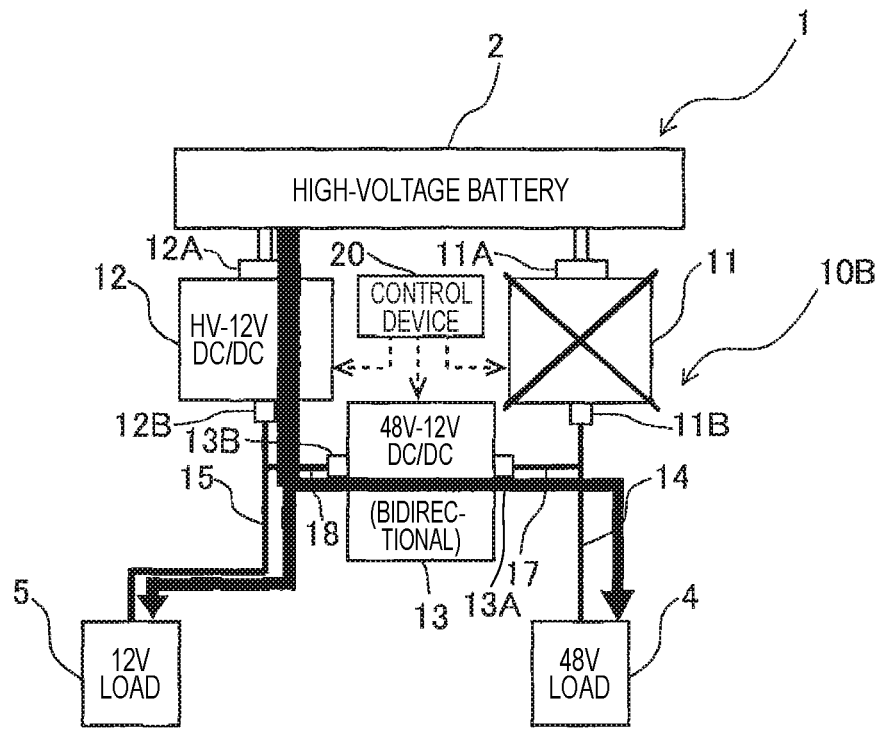
FIG. 19 is a diagram illustrating an operation of the voltage conversion device when the HV-48V DC/DC converter fails.

FIG. 19 is a diagram illustrating an operation of the voltage conversion device 10B when the HV-48V DC/DC converter 11 fails. As illustrated in FIG. 19, when the HV-48V DC/DC converter 11 fails, the control device 20 drives the HV-12V DC/DC converter 12 to step down the high voltage output from the high-voltage battery 2 to 12 V, and drives the 48V-12V DC/DC converter 13 to step up the 12 V output from the HV-12V DC/DC converter 12 to 48 V.

Accordingly, when the HV-48V DC/DC converter 11 fails, the high voltage output from the high-voltage battery 2 is supplied to the 48V load 4 through a step-down to 12 V by the HV-12V DC/DC converter 12 and a step-up to 48 V by the 48V-12V DC/DC converter 13. That is, when the HV-48V DC/DC converter 11 fails, a voltage conversion function of the HV-48V DC/DC converter 11 is complemented by the 48V-12V DC/DC converter 13.

Figure 20:
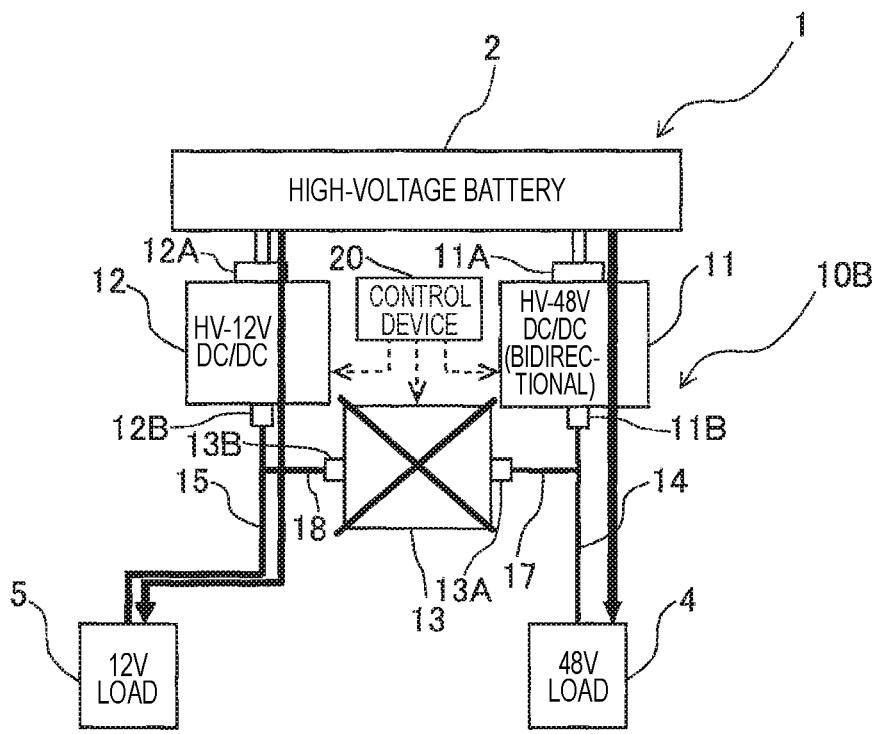
FIG. 20 is a diagram illustrating an operation of the voltage conversion device when a 48V-12V DC/DC converter fails.

FIG. 20 is a diagram illustrating an operation of the voltage conversion device 10B when the 48V-12V DC/DC converter 13 fails. As illustrated in FIG. 20, when the 48V-12V DC/DC converter 13 fails, the control device 20 drives the HV-48V DC/DC converter 11 to step down the high voltage output from the high-voltage battery 2 to 48 V. In addition, the control device 20 drives the HV-12V DC/DC converter 12 to step down the high voltage output from the high-voltage battery 2 to 12 V.

Accordingly, when the 48V-12V DC/DC converter 13 fails, the high voltage output from the high-voltage battery 2 is stepped down to 48 V by the HV-48V DC/DC converter 11 and supplied to the 48V load 4. In addition, the high voltage output from the high-voltage battery 2 is stepped down to 12 V by the HV-12V DC/DC converter 12 and supplied to the 12V load 5. That is, when the 48V-12V DC/DC converter 13 fails, the voltage conversion function of the 48V-12V DC/DC converter 13 is complemented by the HV-48V DC/DC converter 11 and the HV-12V DC/DC converter 12.

Figure 21:
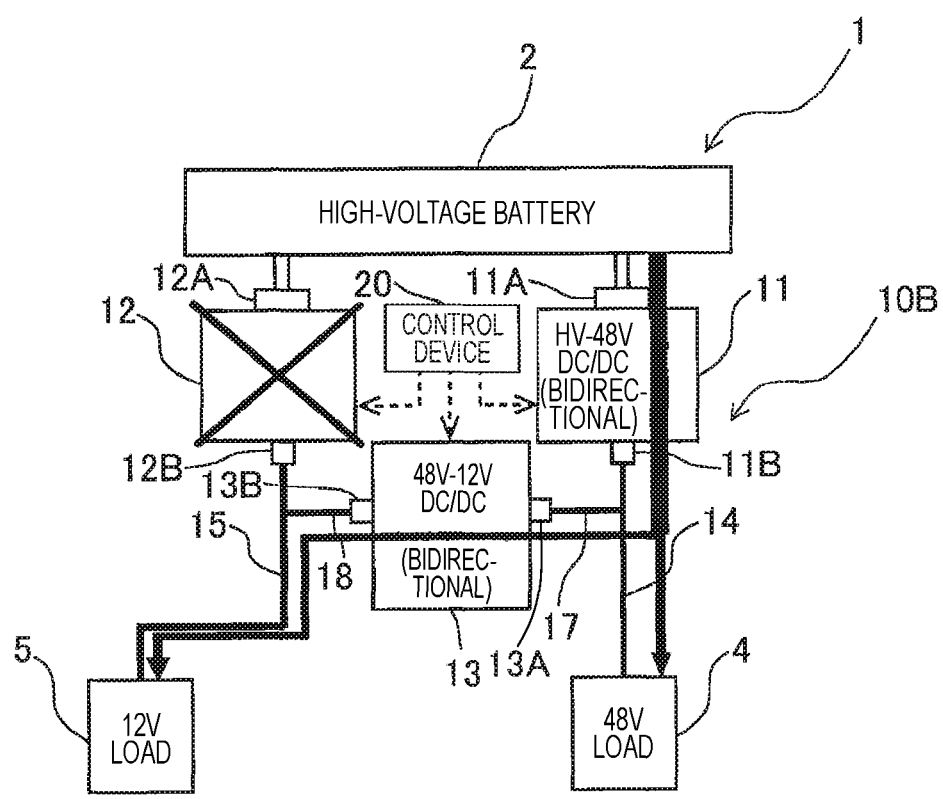
FIG. 21 is a diagram illustrating an operation of the voltage conversion device when an HV-12V DC/DC converter fails.

FIG. 21 is a diagram illustrating an operation of the voltage conversion device 10B when the HV-12V DC/DC converter 12 fails. As illustrated in FIG. 21, when the HV-12V DC/DC converter 12 fails, the control device 20 drives the HV-48V DC/DC converter 11 to step down the high voltage output from the high-voltage battery 2 to 48 V, and drives the 48V-12V DC/DC converter 13 to step down the 48 V output from the HV-48V DC/DC converter 11 to 12 V.

Accordingly, when the HV-12V DC/DC converter 12 fails, the high voltage output from the high-voltage battery 2 is supplied to the 12V load 5 through a step-down to 48 V by the HV-48V DC/DC converter 11 and a step-down to 12 V by the 48V-12V DC/DC converter 13. That is, when the HV-12V DC/DC converter 12 fails, a voltage conversion function of the HV-12V DC/DC converter 12 is complemented by the HV-48V DC/DC converter 11 and the 48V-12V DC/DC converter 13.

As described above, in the voltage conversion device 10B of the present embodiment, the efficiency of the HV-48V DC/DC converter 11 is set to reach a peak when the input power is the intermediate power between the steady power and the peak power. When the power used by the 48V load 4 is lower than the above-mentioned intermediate power, the 48V-12V DC/DC converter 13 is driven to supply power to the 12V load 5. Accordingly, when the power used by the 48V load 4 is lower than the intermediate power, the input power of the HV-48V DC/DC converter 11 is set to the intermediate power between the steady power and the peak power, and the HV-48V DC/DC converter 11 can be driven with high efficiency. In addition, by assisting power supply to the 12V load 5, conversion power of the HV-12V DC/DC converter 12 can be reduced, which contributes to achieving an increase in efficiency of the HV-12V DC/DC converter 12.

Although the present disclosure has been described above based on the embodiment, the present disclosure is not limited to the embodiment described above, and modifications may be made without departing from the gist of the present disclosure, or publicly known or well-known techniques may be appropriately combined.

For example, in the voltage conversion device 10 of the above-mentioned embodiment, it is not essential to set the efficiency of the HV-48V DC/DC converter 11 to the peak when the input power is the steady power of the 48V load 4. In the voltage conversion device 10 of the above-mentioned embodiment, the efficiency of the HV-48V DC/DC converter 11 when the input power is the steady power of the 48V load 4 may be set higher than the efficiency of the HV-48V DC/DC converter 11 when the input power is the peak power of the 48V load 4.

Similarly, in the voltage conversion device 10A of the above-mentioned embodiment, it is not essential to set the efficiency of the HV-48V DC/DC converter 11 to the peak when the input power is the peak power of the 48V load 4. In the voltage conversion device 10A of the above-mentioned embodiment, the efficiency of the HV-48V DC/DC converter 11 when the input power is the peak power of the 48V load 4 may be set higher than the efficiency of the HV-48V DC/DC converter 11 when the input power is the steady power of the 48V load 4.

According to a first aspect of the present disclosure, a voltage conversion device (10, 10A, 10B) includes: a first DC/DC converter (11) connected to a storage battery (2) that outputs a first voltage and configured to step down the first voltage input from the storage battery (2) to a second voltage, a first power supply path (14) configured to supply the second voltage from the first DC/DC converter (11) to a first load ( ), a second DC/DC converter (12) connected to the storage battery (2) and configured to step down the first voltage input from the storage battery (2) to a third voltage lower than the second voltage, a second power supply path (15) configured to supply the third voltage from the second DC/DC converter (12) to a second load (5), a third DC/DC converter (13) connected to the first power supply path (14) and the second power supply path (15), configured to step down the second voltage input from the first power supply path (14) to the third voltage, and step up the third voltage input from the second power supply path (15) to the second voltage, and a control unit (20) configured to control the first DC/DC converter (11), the second DC/DC converter (12), and the third DC/DC converter (13).

According to a second illustrative aspect of the present disclosure, a control device (20) controls a voltage conversion device (10, 10A, 10B), in which the voltage conversion device (10, 10A, 10B) includes: a first DC/DC converter (11) connected to a storage battery (2) that outputs a first voltage and configured to step down the first voltage input from the storage battery (2) to a second voltage; a first power supply path (14) configured to supply the second voltage from the first DC/DC converter (11) to a first load (4); a second DC/DC converter (12) connected to the storage battery (2) and configured to step down the first voltage input from the storage battery (2) to a third voltage lower than the second voltage; a second power supply path (15) configured to supply the third voltage from the second DC/DC converter (12) to a second load (5); and a third DC/DC converter (13) connected to the first power supply path (14) and the second power supply path (15), configured to step down the second voltage input from the first power supply path (14) to the third voltage, and step up the third voltage input from the second power supply path (15) to the second voltage. Efficiency of the first DC/DC converter (11) with respect to steady power of the first load (4) is set to be higher than efficiency of the first DC/DC converter (11) with respect to peak power of the first load (4). The control device (20) is configured to, when the peak power of the first load (4) is used, drive the first DC/DC converter (11) to step down the first voltage input to the first DC/DC converter (11) to the second voltage, and drive the third DC/DC converter (13) to step up the third voltage input to the third DC/DC converter (13) to the second voltage.

According to a third illustrative aspect of the present disclosure, a control device (20) controls a voltage conversion device (10, 10A, 10B), in which the voltage conversion device (10, 10A, 10B) includes: a first DC/DC converter (11) connected to a storage battery (2) that outputs a first voltage and configured to step down the first voltage input from the storage battery (2) to a second voltage; a first power supply path (14) configured to supply the second voltage from the first DC/DC converter (11) to a first load (4); a second DC/DC converter (12) connected to the storage battery (2) and configured to step down the first voltage input from the storage battery (2) to a third voltage lower than the second voltage; a second power supply path (15) configured to supply the third voltage from the second DC/DC converter (12) to a second load (5); and a third DC/DC converter (13) connected to the first power supply path (14) and the second power supply path (15), configured to step down the second voltage input from the first power supply path (14) to the third voltage, and step up the third voltage input from the second power supply path (15) to the second voltage. Efficiency of the first DC/DC converter (11) with respect to peak power of the first load (4) is set to be higher than efficiency of the first DC/DC converter (11) with respect to steady power of the first load (4). The control device (20) is configured to, when the steady power of the first load (4) is used, drive the first DC/DC converter (11) to step down the first voltage input to the first DC/DC converter (11) to the second voltage, and drive the third DC/DC converter (13) to step down the second voltage input to the third DC/DC converter (13) to the third voltage.

According to the present disclosure, in the power supply system including a plurality of power supplies, the efficiency of the DC/DC converter can be improved, the redundancy between the plurality of power supplies can be ensured, and the regenerative power can be efficiently absorbed.

What is claimed is:

1. A voltage conversion device, comprising:
    a first DC/DC converter connected to a storage battery that outputs a first voltage and configured to step down the first voltage input from the storage battery to a second voltage,
    a first power supply path configured to supply the second voltage from the first DC/DC converter to a first load,
    a second DC/DC converter connected to the storage battery and configured to step down the first voltage input from the storage battery to a third voltage lower than the second voltage,
    a second power supply path configured to supply the third voltage from the second DC/DC converter to a second load,
    a third DC/DC converter connected to the first power supply path and the second power supply path, configured to step down the second voltage input from the first power supply path to the third voltage, and step up the third voltage input from the second power supply path to the second voltage, and
    a control unit configured to control the first DC/DC converter, the second DC/DC converter, and the third DC/DC converter, wherein efficiency of the first DC/DC converter with respect to steady power of the first load is set to be higher than efficiency of the first DC/DC converter with respect to peak power of the first load, and the control unit is configured to, when the peak power of the first load is used, drive the first DC/DC converter to step down the first voltage input to the first DC/DC converter to the second voltage, and drive the third DC/DC converter to step up the third voltage input to the third DC/DC converter to the second voltage.

2. A voltage conversion device, comprising:

a first DC/DC converter connected to a storage battery that outputs a first voltage and configured to step down the first voltage input from the storage battery to a second voltage, a first power supply path configured to supply the second voltage from the first DC/DC converter to a first load, a second DC/DC converter connected to the storage battery and configured to step down the first voltage input from the storage battery to a third voltage lower than the second voltage, a second power supply path configured to supply the third voltage from the second DC/DC converter to a second load, a third DC/DC converter connected to the first power supply path and the second power supply path, configured to step down the second voltage input from the first power supply path to the third voltage, and step up the third voltage input from the second power supply path to the second voltage, and a control unit configured to control the first DC/DC converter, the second DC/DC converter, and the third DC/DC converter, wherein efficiency of the first DC/DC converter with respect to peak power of the first load is set to be higher than efficiency of the first DC/DC converter with respect to steady power of the first load, and the control unit is configured to, when the steady power of the first load is used, drive the first DC/DC converter to step down the first voltage input to the first DC/DC converter to the second voltage, and drive the third DC/DC converter to step down the second voltage input to the third DC/DC converter to the third voltage.

3. The voltage conversion device according to claim 1, further comprising:

an auxiliary storage battery connected to the second power supply path, configured to output the third voltage to the second power supply path during a step-up operation of the third DC/DC converter, and to which the third voltage is input from the second power supply path during a step-down operation of the third DC/DC converter.

4. The voltage conversion device according to claim 1, wherein the control unit is configured to drive the third DC/DC converter to step down the second voltage input to the third DC/DC converter to the third voltage when regenerative power of the first load is generated.

5. The voltage conversion device according to claim 4, wherein the control unit is configured to drive the first DC/DC converter to step up the second voltage input to the first DC/DC converter to the first voltage when the regenerative power of the first load is generated.

6. The voltage conversion device according to claim 5, wherein the control unit is configured to drive the third DC/DC converter to step up the third voltage input to the third DC/DC converter to the second voltage when the first DC/DC converter fails.

7. The voltage conversion device according to claim 1, wherein the control unit is configured to, when the first DC/DC converter fails, drive the second DC/DC converter to step down the first voltage input to the second DC/DC converter to the third voltage, and drive the third DC/DC converter to step up the third voltage input to the third DC/DC converter to the second voltage.

8. The voltage conversion device according to claim 1, wherein the control unit is configured to, when the second DC/DC converter fails, drive the first DC/DC converter to step down the first voltage input to the first DC/DC converter to the second voltage, and drive the third DC/DC converter to step down the second voltage input to the third DC/DC converter to the third voltage.

9. A control device of the voltage conversion device for controlling the voltage conversion device according to claim 1.

10. A control device of the voltage conversion device for controlling the voltage conversion device according to claim 2.

* * * * *